United States Patent [19]
Bronicki

[11] Patent Number: 4,942,736
[45] Date of Patent: Jul. 24, 1990

[54] METHOD OF AND APPARATUS FOR PRODUCING POWER FROM SOLAR ENERGY

[75] Inventor: Lucien Y. Bronicki, Yavne, Israel
[73] Assignee: Ormat Inc., Sparks, Nev.
[21] Appl. No.: 246,149
[22] Filed: Sep. 19, 1988
[51] Int. Cl.$^5$ .............................................. F03G 7/02
[52] U.S. Cl. .......................... 60/641.12; 60/641.15; 60/652; 60/655; 60/659; 60/676; 60/682
[58] Field of Search ............ 60/641.8, 641.11, 641.12, 60/641.13, 641.14, 641.15, 650, 655, 659, 664, 676, 682, 652

[56] References Cited

U.S. PATENT DOCUMENTS

| | | | |
|---|---|---|---|
| 4,189,922 | 2/1980 | Bellofatto | 60/659 X |
| 4,581,897 | 4/1986 | Sankrithi | 60/641.15 X |
| 4,765,142 | 8/1988 | Nakhamkin | 60/659 X |

FOREIGN PATENT DOCUMENTS

| | | | |
|---|---|---|---|
| 105606 | 8/1979 | Japan | 60/641.14 |
| 148907 | 11/1980 | Japan | 60/655 |

Primary Examiner—Stephen F. Husar
Attorney, Agent, or Firm—Sandler, Greenblum & Bernstein

[57] ABSTRACT

The present invention provides a method of and apparatus for producing power from solar energy wherein a solar collector heats gas supplied to a gas turbine; compressors compress the gas, the gas being compressed and stored gas during a first period of time, with the stored compressed gas being supplied to the gas turbine during a second period of time to produce power by driving an electric generator. Preferably, the first period of time is during periods of off-peak electricity, which normally occur at night. The second period of time is during the day. The solar collector preferably comprises tracking reflectors for focusing solar radiation and a receiver for receiving the focused solar radiation and also heating the gas. The solar radiation receiver preferably comprises a rotating ceramic member. Furthermore, a combustion chamber is preferably provided to heat the gas entering the gas turbine and is operated by a temperature sensing/control unit when the solar radiation received by the receiver is insufficient to heat the gas entering the gas turbine to the required temperature. The electric motor used to operate the compressors preferably comprises the electric generator of the gas turbine. Furthermore, heat generated during the compression of the gas and contained therein is transferred to another fluid in a heat exchanger which comprises part of waste heat converter for producing electrical power therefrom.

36 Claims, 3 Drawing Sheets

METHOD OF AND APPARATUS FOR PRODUCING POWER FROM SOLAR ENERGY

TECHNICAL FIELD

This invention relates to producing power from solar energy and more particularly is concerned with a method of and apparatus for producing power from solar energy using a gas turbine.

BACKGROUND OF THE INVENTION

In recent years, the domestic, commercial and industrial power consumption, in many countries, particularly at hours of peak power consumption, has been growing at a seemingly ever increasing rate. Since electric power utility companies are obligated to furnish power demand at the level required even if such power consumption levels occur infrequently for only a few hours a day, the generating power capacity of the electric utility companies must be such as to provide power at the required power level whenever called upon. Normally, and particularly in many countries in the summer time, hours of peak power consumption occur during the day with consumption levels falling to their so-called "off-peak" levels during the night.

Since the peak power demands on the electric utility companies occur only for relatively short periods of time, the electric utility conventionally operates generating plants having minimal costs and reasonably low operating costs, for example coal burning plants to supply the base load and intermediate load of customers connected to the electric grid with more expensive operating plants such as gas turbines being quickly brought onto line to furnish power during the short periods of peak demand. Consequently, the cost of peak power is normally several times larger than the cost of what is called baseload or "off-peak" power.

It is therefore an object of the present invention to provide a new and improved method of and apparatus for producing electrical power during periods of peak power demand wherein the disadvantages as outlined including and related to the relatively large costs are reduced or substantially overcome.

SUMMARY OF THE INVENTION

The present invention provides a method of and apparatus for producing power from solar energy, the method comprising the steps of heating gas supplied to a gas turbine using a solar collector; compressing the gas during a first period of time using a compressor; storing the compressed gas during the first period of time in a storage reservoir and supplying the compressed gas from the storage reservoir to the gas turbine during a second period of time to produce power by driving an electric generator. Preferably, the first period of time is during periods of off-peak electricity, which normally occurs at night. Off-peak electricity periods of time are periods of time when the price of electricity is relatively cheap. The second period of time is during the day. The solar collector preferably comprises tracking reflectors for focusing solar radiation and a receiver for receiving the focused solar radiation and also heating the gas. The solar radiation receiver preferably comprises a rotating member preferably constructed from ceramic material.

In addition, combustion chambers are also preferably provided for heating the gas entering the gas turbine and are preferably operated by a temperature sensing/control unit when the solar radiation received by the receiver is insufficient to heat the gas entering the gas turbine to a required temperature. Normally, the gas used is air. However, other suitable gases may be used.

An electric motor is used to operate the compressors and preferably comprises the electric generator of the gas turbine. In a preferred embodiment, the compressor is a multi-stage compressor and the gas turbine is a multi-stage turbine. Furthermore, heat generated during the compression of the gas and contained therein is transferred to another fluid in a heat exchanger which preferably is part of a waste heat converter for producing electrical power, the waste heat converter being an Organic Rankine Cycle power plant in one embodiment. Thus, in the present invention, available solar energy is utilized to produce electricity, further cutting costs by also preferably compressing gas used in the gas turbine during periods of relatively cheap off-peak electricity.

BRIEF DESCRIPTION OF THE DRAWINGS

Embodiments of the invention are described below by way of example, and with reference to the accompanying drawings wherein.

DETAILED DESCRIPTION

Figure 1:
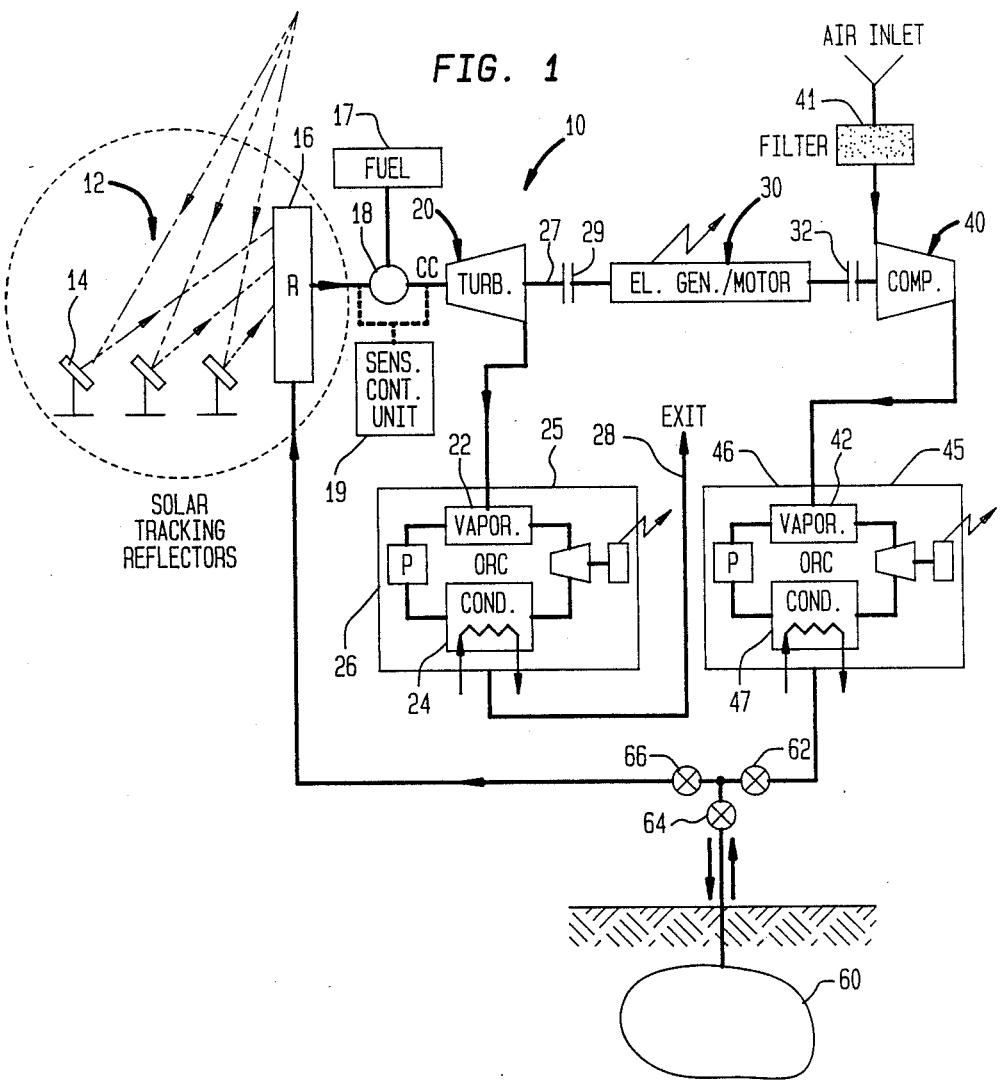
FIG. 1 is a block diagram of one embodiment of apparatus for producing power in accordance with the present invention.

Referring to FIG. 1 of the drawings, reference numeral 10 designates apparatus for producing power in accordance with the present invention. Solar collector 12, comprising tracking reflectors 14 or heliostats for focusing solar radiation and solar radiation receiver 16 for receiving focused solar radiation, is provided for heating compressed air supplied from underground storage reservoir 60 to gas turbine 20, the compressed air being stored in underground storage reservoir 60 during the operation of compressor 40. Gas turbine 30 drives electric generator/motor 20, operating as an electric generator, for producing electric power supplied to the electric grid (not shown). If preferred, however, a separate electric generator can be used. Mirror reflectors can serve as tracking reflectors, and receiver 16 is normally positioned at the top of a tower. In the present invention, existing caverns, such as artificial salt caverns and underground aquifers can be used as storage reservoirs for storing compressed air. Also quite often underground caverns located in geological fields where oil wells exist are suitable for use as storage reservoirs and many times existing oil wells such as dry and old ones etc., can also be utilized in the present invention. Heat exchanger 22 contained in waste heat converter 25 receives heat present in air exhausting turbine 20, and waste heat converter 25 produces electrical power therefrom. Preferably, waste heat converter 25, comprises Organic Rankine Cycle (ORC) power plant 26 containing vaporizer heat exchanger 22 and condenser 24 cooled by cooling water. Heat received in heat exchanger vaporizes working fluid of the power plant, the vaporized working fluid being furnished to a turbine for producing electric power. Subsequently, the expended air exits via exhaust conduit 28. Combustion chamber 18, run on fuel supplied from fuel tank 17 and located between receiver 16 and turbine 20, is provided for maintaining a desired temperature of the air entering the gas turbine. Preferably, combustion chamber 18 is operated by sensing/control unit 19. Air exiting receiver 16 flows through combustion chamber 18 to gas turbine 20. Alternatively, air exiting solar receiver 16 can flow directly to turbine 20 via suitable conduits, avoiding passage through the combustion chamber when the air temperature is sufficient, and can be diverted by using suitably arranged valves and piping to also flow through the combustion chamber when this is brought into operation. Compressor 40, which compresses air supplied through filter 41, is driven by electric generator/ motor unit 20. If preferred, a separate electric motor can be used to drive the compressor. Heat exchanger 42, contained in waste heat converter 45, receives heat present in air compressed in compressor 40, and the waste heat converter produces electrical power therefrom during the operation of the compressers. Preferably, waste heat converter 45, comprises Organic Rankine Cycle (ORC) power plant 46 containing vaporizer heat exchanger 42 and condenser 47 cooled water. The heat received by heat exchanger 42 vaporizes the working fluid of the power plant, these vapors being supplied to the power plant turbine driving a generator for producing electrical power, with the expended vapors being condensed by condenser 47.

Figure 3:
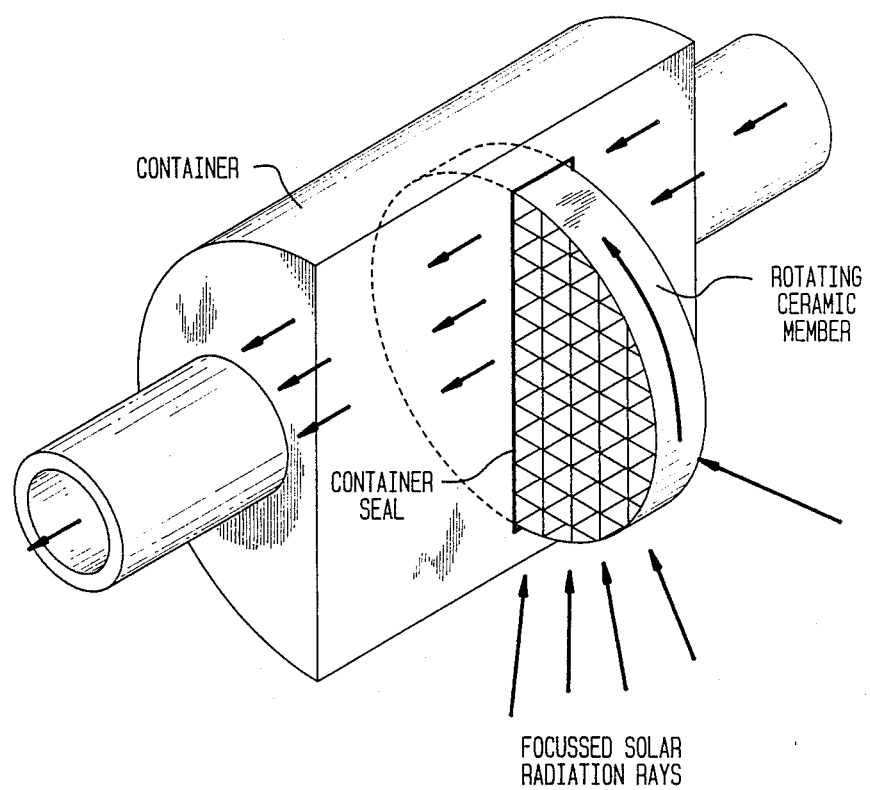

In the present embodiment, solar receiver 16 can comprise a sealed container having pipes connected to the compressed air flow and positioned at the focus of the tracking reflectors for receiving focused solar radiation and heating the compressed air which flows through the pipes. Temperatures and pressures in the pipes can reach 1000 deg. C. and 50 bar or even higher. Preferably, however, the solar receiver may have the configuration shown in FIG. 3. The receiver comprises a sealed container connected to the compressed air flow and a rotating member, a portion of which is positioned external to the sealed container at the focus of the tracking reflectors for receiving the focused solar radiation, the member also rotating within the sealed container where the heat absorbed by the member heats the compressed air flowing past the rotating portion of the member in the container. In the preferred construction of this member, ceramic material is used and the member has a matrix form. Also, the seals of the container are preferably cooled by a gas or air flow.

In operation, compressor 40 driven by electric generator/motor 20 compresses air supplied through filter 41, the compressed air being stored in reservoir 60 by opening valves 62 and 64. Preferably, the air is compressed to a pressure of between 30 to 50 bar, with such a pressure being also maintained in the air storage reservoir. The compressor is operated during periods of off-peak electricity in order to take advantage of the relatively cheap cost of electricity during such periods of time. Normally, such periods of time occur during the night and consequently electric generator/motor 20 is made available for use, acting as an electric motor running compressor 40. Heat generated during compression and present in the compressed air is received by heat exchanger 42 and used to produce electric power via power plant 46 wherein the heated air passes through heat exchanger 42 vaporizing an organic working fluid, such as Freon or the like, the vapors being supplied to the turbine contained in power plant 46 for driving a generator and producing electric power. Vapors exhausted from this turbine are condensed in condenser 47 which is cooled by cooling water, a feed pump returning the condensed organic fluid to vaporizer heat exchanger 42. During the day, the stored compressed air present in storage reservoir 60 is made available by opening valves 64 and 66 and flows toward turbine 20 flowing through solar radiation receiver 16 where focused solar radiation reaching receiver 16 from tracking reflectors 14 heats the compressed air normally to more than several hundred degrees centigrade, the air reaching preferably a temperature of 800 deg. C. However, higher temperatures can be used if required. Subsequently, the heated, compressed air flows through combustion chamber 18 reaching gas turbine 20 where expansion takes place. Expansion in turbine 20 causes the turbine to do work, rotating shaft 27 and driving electric generator/motor 20, now acting as an electric generator and coupled thereto via clutch 29 producing electric power which is supplied to the electric grid. Electric generator/motor 20 is disconnected from compressor 40 by clutch 32. If the temperature of the air exiting solar receiver 16 drops below a desired value due, for example, to the presence of cloud cover reducing the amount of focused radiation reaching the receiver, sensing/control unit 19 senses the temperature drop of the air and brings combustion chamber 18 into operation in order to heat the air to maintain the temperature of air entering turbine 20. Heat remaining in the air or gases exiting gas turbine 20 is received by heat exchanger 22 and used to produce electric power via power plant 26 in a manner similar to that which takes place in power plant 46 described above. Subsequently, the expended gas exiting via conduit 28. Consequently, in the present invention, solar energy is utilized to produce electric power using a gas turbine, the compressed air used to run the gas turbine being compressed and stored during periods of off-peak electricity, thus taking advantage of the relatively cheap cost electricity during such periods. Furthermore, quite often, the periods of time during which electric power is produced by the gas turbine coincides with periods of peak electric power consumption.

Figure 2:
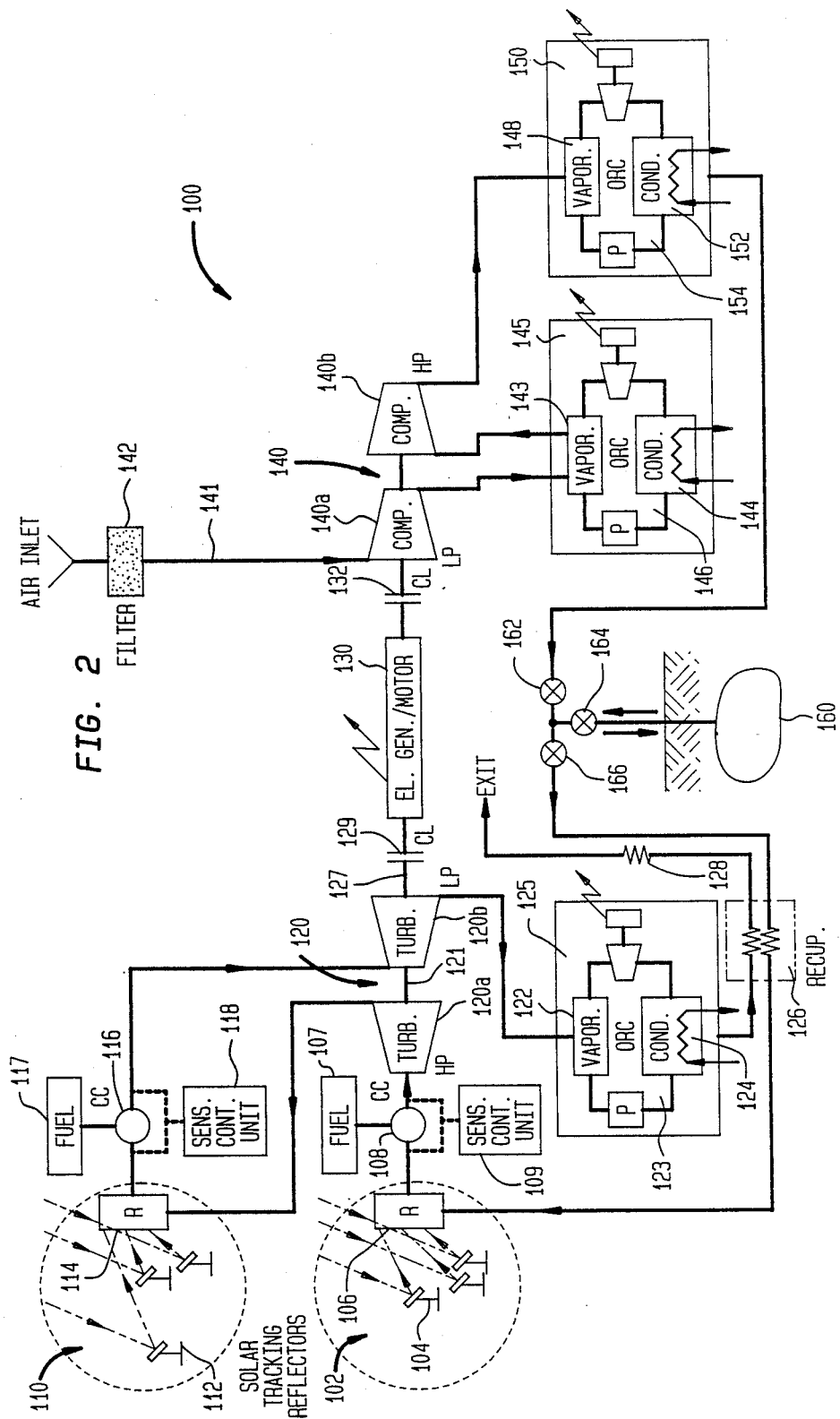
FIG. 2 shows a schematic diagram of a further embodiment of the present invention and FIG. 3 is a perspective view showing details of a solar receiver according to the present invention.

Referring now to FIG. 2, a further embodiment of the present invention is shown wherein reference numeral 100 designates apparatus for producing power from solar energy. This embodiment is similar to the embodiment shown in FIG. 1 except that multi-stage gas turbine 120 and a multi-stage compressor 130 are used, with second solar collector 110 and a further waste heat converter 145 being provided between the stages of the multi-stage turbine and compressor respectively in order to raise the efficiency of the power generating apparatus. Also, recuperator heat exchanger 126 provides additional heating of the compressed air supplied to gas turbine 120. The gas turbine can have a generating capacity of 25 MW or greater. However, the present embodiment is also suitable for smaller generating capacities as well. Solar collector 102, comprising tracking reflectors 104 or heliostats for focussing solar radiation and solar radiation receiver 106 for receiving focused solar radiation, is provided for heating compressed air, the air being compressed by compressor 140 and stored in underground storage reservoir 126 during the operation of multi-stage compressor 140, with the compressed air being supplied to multi-stage gas turbine 120 from storage reservoir 126. Turbine 120 drives electric generator/motor 130, operating as an electric generator, for producing electric power supplied to the electric grid (not shown). If preferred, however, a separate electric generator can be used. As in the embodiment described with reference to FIG. 1, mirror reflectors can be used as tracking reflectors and receiver 106 is normally positioned at the top of a tower. Combustion chamber 108, located between receiver 106 and turbine 120, is provided for maintaining the desired temperature level of the air entering the gas turbine and is run on fuel supplied from fuel tank 107, the combustion chamber being preferably operated by sensing/control unit 109. Air exiting receiver 106 flows through combustion chamber 108 to gas turbine 120. In the present embodiment, multi-stage gas turbine 120, comprises high pressure stage turbine 120a and low pressure stage turbine 120b whereas multi-stage compressor 140 comprises low pressure stage compressor 140a and high pressure compressor 140b operated by electric generator/motor 130, which operates as an electric motor. If preferred however, a separate electric motor can be provided for compressor 140. Solar collector 110, comprising tracking reflectors 112 or heliostats for focussing solar radiation and solar radiation receiver 114 for receiving focused solar radiation, is provided for reheating air or gas exiting high pressure stage turbine 120a with combustion chamber 116, being preferably being operated by sensing/control unit 118 when necessary and run by fuel supplied from fuel tank 117 to maintain the temperature of the gases or air entering low pressure stage turbine 120b. In this manner, the efficiency of gas turbine 18 is improved. Also here, mirror reflectors can be used as tracking reflectors and receiver 114 is normally positioned at the top of a tower. Air or gases exiting receiver 114 flow through combustion chamber 116 to low pressure stage gas turbine 120b. Alternatively, gases can flow directly to turbines 120a and 120b from solar receivers 106 and 114 via suitable conduits, avoiding passage through combustion chambers 108 and 116 when the air or gas temperature is sufficient, and be diverted to also flow through the combustion chambers by suitable piping and valve arrangements when the combustion chambers are brought into operation. Heat exchanger 122, contained in waste heat converter 125 receives heat present in air or gases exiting low pressure stage turbine 120b, and waste heat converter 125 produces electrical power therefrom. As shown in FIG. 2, waste heat convertor 125 preferably comprises Organic Rankine Cycle (ORC) power plant 123, whereas in such case heat exchanger 122 comprises a vaporizer for vaporizing the working fluid of the power plant, these vapors being supplied to a turbine contained therein for producing electrical power, the expended vapors exiting the turbine being condensed in condenser 124 cooled by cooling water. Recuperator heat exchanger 126 is provided for utilizing residual heat remaining in air or gases leaving power plant 123 to preheat the compressed air supplied from storage reservoir 160 to solar receiver 106. Exhaust conduit 86 furnishes an exit for the expended air or gases to the ambient air. In the present embodiment, heat exchanger 143, contained in waste heat converter 145, preferably comprising Organic Rankine Cycle power plant 146 wherein heat exchanger 143 is a vaporizer, is provided for producing electrical power from heat contained in compressed air exhausting from low pressure stage compressor 140a. In addition, waste heat converter 150, containing heat exchanger 148 for receiving heat present in compressed air exiting high pressure stage compressor 140b is provided for producing electric power therefrom. As can be seen from FIG. 2, waste heat converter 150 preferably comprises Organic Rankine Cycle power plant 154.

Similar to solar receiver 16 described in relation to the previous embodiment shown in FIG. 1, solar receivers 106 and 114 in the present embodiment also can comprise a sealed container having pipes positioned at the focus of the tracking reflectors for receiving focussed solar radiation and heating the compressed air or gases which flow through the pipes with operating temperatures and pressures in the pipes possibly reaching 1000 deg. C. and 50 bar or even higher. However, operating temperatures and pressures of gases or air in receiver 114, positioned between the stages of the gas turbine 120 could be lower than these. Preferably, however, also, solar receivers 106 and 114 comprise a rotating member a portion of which is positioned external to a sealed container at the focus of the tracking reflectors for receiving the focussed solar radiation, the member also rotating within the sealed container where it transfer heat to the compressed air or gases flowing past the rotating portion of the member in the container. Also here, the member is preferably constructed from ceramic material with the member having a matrix form and the seals of the container being preferably cooled by a gas or air When compressors 140a and 140b driven by electric generator/motor 130 commence operation, air supplied through filter 142 via conduit 141 to the compressors is compressed to a pressure of between 30 to 50 bar, the compressed air being stored at similar pressure in reservoir 160 by opening valves 162 and 164. In a similar manner to the previous embodiment, th compressors are operated during periods of off-peak electricity taking advantage of the relatively cheap cost of electricity during such periods of time. Normally, such periods of time occur during the night and consequently permitting electric generator/motor 130 to operate as an electric motor running compressors 140a and 140b. Heat generated during compression and present in the compressed air is received heat exchangers 143 and 148 and is used to produce electric power using power plants 146 and 154 in a manner analogous to power plants 26 and 46 contained in the previous embodiment shown in FIG. 1. During the day, stored compressed air is made available from storage reservoir 160 by opening valves 166 and 164 and flows toward multi-stage turbine 120 flowing through recuperator heat exchanger 126 and solar radiation receiver 106 where focussed solar radiation reaching receiver 106 from tracking reflectors 104 heats the compressed air normally to more than several hundred degrees centigrade, the gases reaching preferably a temperature of 800 deg. C. If necessary, however, also in the present embodiment, higher temperatures can be used. This heated compressed air now flows through combustion chamber 108 reaching high pressure stage turbine 120a where expansion takes place. Expanded gases exhausted from turbine 120a flow through receiver 114 and combustion chamber 116 where they are heated once again to relatively high temperatures of several hundred degrees, the heated gases being subsequently supplied to low pressure stage turbine 120b where expansion occurs once again. During expansion, turbines 120a and 120b do work, and shaft 121 and shaft 127 respectively are rotated thereby, driving electric generator/motor 130, now acting as an electric generator producing electric power. Shaft 127 is coupled to electric generator/motor 130 via clutch 129 and disconnected from compressor 140 by clutch 132. If the temperature of the air or gases exiting either solar receivers 106 and 114 drops below a desired value, sensing/control units 109 and 118 sense the temperature drop of the air or gases and bring combustion chambers 108 and 116 respectively into operation for maintaining the temperature of gases or air entering turbines 120a and 120b. Gases exiting low pressure stage turbine 120b flow to heat exchanger 122 of Organic Rankine Cycle power plant 123 where heat contained therein is used to vaporize the working fluid of this power plant, such as Freon etc., the vapors being supplied to the power plant turbine to produce electric power by driving a generator. Vapors exiting the power plant turbine are condensed in condenser 124 cooled by cooling water with a feed pump returning the condensed organic fluid to heat exchanger 122. Further heat contained in gases or air exiting power plant 123 are used in recuperator 126 to heat compressed air flowing from air reservoir 160 to receiver 106. Expended gases are exhausted from apparatus 100 via exhaust conduit 128.

It is believed that the advantages and improved results furnished by the method and apparatus of the present invention are apparent from the foregoing description of the embodiments of the invention. Various changes and modifications may be made without departing from the spirit and the scope of the invention as described in the claims that follow.

What is claimed is:

1. A method for producing power from solar energy comprising the steps of: compressing gas from an ambient source during a first period of time and storing the compressed gas in a storage reservoir: and supplying said compressed gas from the storage reservoir to a gas turbine through a solar collector during a second period of time to produce electricity.

2. A method according to claim 1 wherein first period of time coincides with periods of off-peak demand for electricity.

3. The method according to claim 1 wherein said first period of time is during the night and said second period of time is during the day.

4. The method according to claim 1 further comprising the step of cooling the compressed gas prior to storing it by supplying heat present in the compressed gas to another fluid in a heat exchanger.

5. The method according to claim 4 further comprising producing electric power using heat supplied to said fluid in said heat exchanger, said heat exchanger being part of a waste heat converter.

6. The method according to claim 5 wherein said heat supplied to the fluid is used to vaporize the fluid, the vapors being supplied to a turbine contained in said waste heat converter to produce electric power, said waste heat converter being an Organic Rankine cycle power plant.

7. The method according to claim 1 further comprising the step of heating the gas prior to supplying it to said turbine using a combustion chamber.

8. The method according to claim 7 wherein said solar collector comprises tracking reflectors for focusing solar radiation and a receiver positioned at the top of a tower for receiving the focused solar radiation, said receiver being used to heat the gas.

9. The method according to claim 8 further comprising the step of commencing operation of said combustion chamber in response to sensing a fall in temperature of the gas exiting the solar receiver below a predetermined value.

10. A method according to claim 2 including the step of extracting work from the gases exhausted from the turbine.

11. An apparatus for producing power from solar energy using a gas turbine for driving an electric generator comprising: compressor means for compressing gas: a storage reservoir for storing gas compressed by said compressor means during a first period of time: a solar collector for heating gas from the reservoir: and means for supplying gas from the storage reservoir to the turbine through said solar collector during a second period of time to produce power by driving the electric generator and producing electricity.

12. An apparatus according to claim 11 wherein said first period of time is during periods of off-peak demand for electricity.

13. Apparatus according to claim 11 wherein said first period of time is during the night and said second period of time is during the day.

14. Apparatus according to claim 11 further comprising a heat exchanger for cooling the compressed gas.

15. Apparatus according to claim 14 wherein said heat exchanger is part of a waste heat converter for producing electrical power.

16. Apparatus according to claim 14 wherein said waste heat converter is an Organic Rankine Cycle power plant and said heat exchanger is a vaporizer for vaporizing the organic working fluid of the Organic Rankine Cycle power plant.

17. Apparatus according to claim 11 wherein said solar collector comprises tracking reflectors for focusing solar radiation and a receiver positioned at the top of a tower for receiving the focused solar radiation and heating the gas.

18. Apparatus according to claim 17 further comprising a combustion chamber for heating gas prior to supplying it to the gas turbine.

19. Apparatus according to claim 18 wherein the solar radiation receiver and combustion chamber are arranged such that the gas flowing to said gas turbine passes through the solar receiver and said combustion chamber.

20. Apparatus according to claim 17 wherein said solar radiation receiver comprises a rotating ceramic member.

21. Apparatus according to claim 11 further comprising an electric motor for driving said compressor.

22. Apparatus according to claim 21 wherein said electric motor comprises the electric generator driven by the gas turbine during the second period of time.

23. Apparatus according to claim 11 wherein said gas turbine is a multi-stage turbine and said compressor is a multi-stage compressor.

24. Apparatus according to claims 11 wherein said gas is air.

25. Apparatus according to claim 19 further comprising a sensing/control unit for sensing the temperature of the gas exiting the solar receiver and for sending a signal to the combustion chamber to commence operation when the temperature of the gas falls below a predetermined value.

26. An apparatus according to claim 11 including a means responsive to heat in the gases exhausted from the gas turbine for generating power.

27. An apparatus for producing power from solar energy comprising:

(a) a gas turbine;
(b) solar reflectors for focusing solar radiation;
(c) a receiver for receiving said focused solar radiation and heating gas prior to the gas entering said gas turbine;
(d) a compressor for compressing the gas;
(e) a storage reservoir for storing said compressed gas and
(f) means for supplying compressed gas from said reservoir to said gas turbine through said receiver.

28. An apparatus according to claim 27 including a combustion chamber for heating gas, said combustion chamber being interposed between the receiver and the turbine for heating gas prior to its entering the gas turbine.

29. Apparatus according to claim 28 wherein said gas turbine is a multi-stage turbine having a high pressure stage and a low pressure stage.

30. Apparatus according to claim 29 further comprising a second solar collector and second combustion chamber for heating gas exiting said high pressure stage prior to entering said low pressure stage of multi-stage turbine.

31. Apparatus according to claim 30 wherein said second solar collector comprises tracking reflectors for focusing solar radiation and a receiver positioned at the top of a tower for receiving the focused solar radiation and heating the gas.

32. A method for producing power from solar energy comprising the steps of:

(a) compressing and storing gas in a storage reservoir during a first period of time;
(b) supplying said compressed gas from the storage reservoir to a multi-stage gas turbine during a second period of time to produce electric power;
(c) supplying gas to the high pressure stage of said multi-stage gas turbine through the receivers of a first solar collector having solar reflectors for focusing solar radiation on the receivers thereby heating the gas;
(d) heating gas exiting said high pressure stage using a second solar collector prior to the exiting gas entering the low pressure stage of the multi-stage turbine; and
(e) providing separate combustion chambers for heating gases supplied to the high pressure and low pressure stages of said multi-stage turbine.

33. A method according to claim 32 further comprising the step of commencing operation of said combustion chambers in response to sensing a decrease in temperature of the gases exiting either said first or second solar collectors below a predetermined value.

34. A method according to claim 32 wherein said first period of time coincides with periods of off-peak demand for electricity.

35. A method according to claim 32 wherein second period of time coincides with periods of peak demand for electricity.

36. A method according to claim 32 wherein said first period of time is during the night and said second period of time is during the day.

* * * * *